July 4, 1939.  J. G. PROSSER ET AL  2,164,625
CONCRETE PIPE AND METHOD OF PRODUCING SAME
Filed May 4, 1937
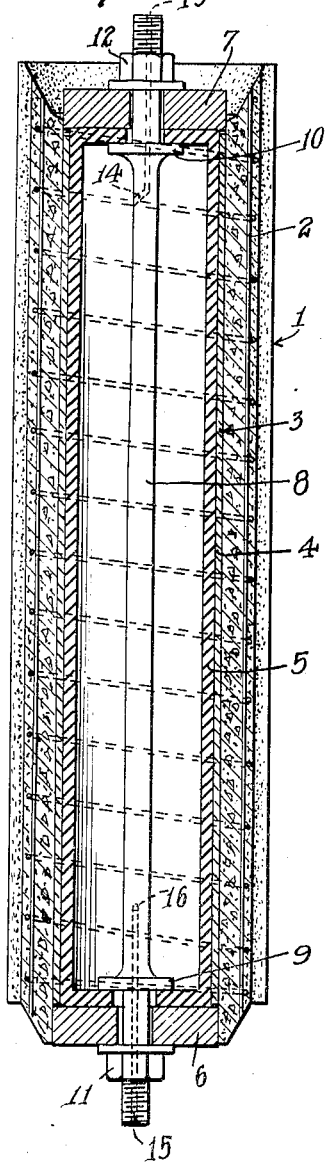
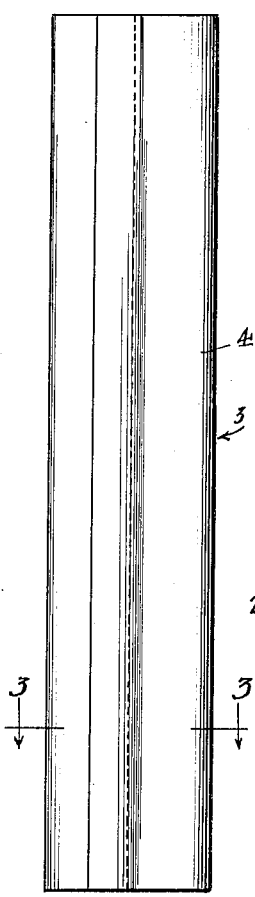
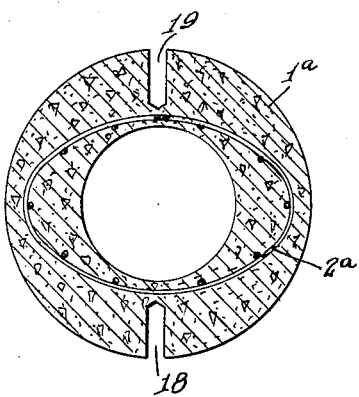
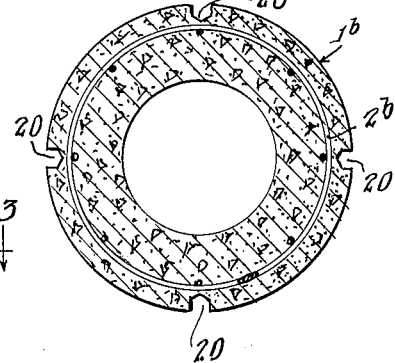
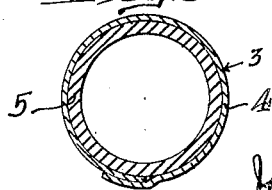
Inventors
Joseph G. Prosser
Elmer L. Johnson
By Lyon & Lyon
Attorneys Patented July 4, 1939

2,164,625

UNITED STATES PATENT OFFICE 2,164,625

CONCRETE PIPE AND METHOD OF PRODUCING SAME

Joseph G. Prosser, Onekama, Mich., and Elmer L. Johnson, Loma Linda, Calif.

Application May 4, 1937, Serial No. 140,658

6 Claims. (Cl. 138—84)

Concrete pipe is frequently used, such as in a water distributing system, where a considerable pressure has to be resisted by the pipe. It is common in the construction of such concrete pipe to provide the pipe with a reinforcing steel for the purpose of strengthening the pipe against the expanding pressure placed within the pipe. The elasticity of the steel reinforcing is, however, much greater than that of the concrete, with the result that steel reinforcement is not very effective in preventing rupture in the pipe. In fact, in most cases, the strength of the steel reinforcement does not become manifest until the pipe is ruptured sufficiently to place a substantial stretch upon the reinforcement. The result is that it is very difficult to prevent leakage of concrete pipe which is to hold water or other fluid under considerable pressure.

The general object of the present invention is to provide a concrete pipe and method of producing the same, by which the strength of the reinforcement of the pipe may be utilized to prevent rupture of the pipe during use.

Generally, the present invention comprehends the construction of a concrete pipe so that the steel reinforcement is prestretched or under tension and placing a compressive load on the concrete of the pipe. By prestretching the reinforcement of the pipe during the process of making the pipe the strength of the reinforcement is available for resisting the expanding pressure of water within the pipe, and as a result thereof the concrete pipe of the present invention is enabled to withstand large internal pressures without leakage or cracking.

In order to produce a concrete pipe with the reinforcing in a prestretched condition, we proceed, first, with the formation of a reinforced concrete pipe in any usual or preferred way and then proceed to subject the pipe to an expanding force, which is preferably greater than that which the pipe will thereafter be required to sustain. This expanding force will cause a rupture or cracking of the concrete of the pipe. While the pipe is still under expanding force so that the steel is in a stretched condition, we then proceed to repair the cracks in the pipe by suitable means. After the repair material has solidified, the internal pressure within the pipe is released, the steel reinforcement then remains under the prestretched condition, and the concrete of the pipe is under compression. Concrete has a great resistance to compression, but is very weak with respect to tension. The result is that pipe of the present invention will, when applied to use, sustain large internal pressures without further rupture, cracking or leakage. In the process of manufacture of the pipe, we preferably cause the pipe to rupture at selected points in prestretching the steel in order to facilitate the repair or filling of the cracks or seams resulting from such rupture.

The concrete pipe of the present invention, together with the process of producing same, will best be understood from a description of a preferred form or example of concrete pipe and process of producing same embodying the present invention. We have, therefore, hereinafter described in connection with the accompanying drawing the preferred concrete pipe and process of producing the same.

In the drawing:

Figure 1 is a longitudinal section through a concrete pipe during the process of rupturing the same to prestretch the steel.

Figure 2 is an elevation of a portion of the apparatus used for developing the internal pressure.

Figure 3 is a section on the line 3—3 of Figure 2.

Figure 4 is a section through a concrete pipe before rupturing the same, showing one way of predetermining the place of rupture.

Figure 5 is a similar section through a modified form of pipe.

Referring to the drawing, I generally indicates a concrete pipe having a reinforcing 2. In order to apply an internal pressure to the pipe which may be preferably in excess of that which the pipe is designed to hold, we insert into the pipe an expander 3, said expander 3 comprising a split sheet metal lining 4, behind which is placed a rubber sleeve 5. The sleeve 5 is at its ends made fluid-tight with plates 6 and 7, through which pass a rod 8 having the flanges 9 and 10 to tighten the rubber lining 5 against the plates 6 and 7, the rod 8 also being provided with nuts 11 and 12 threaded therethrough. The rod 8 is provided with a bore 13 communicating with a space behind the rubber lining, as indicated at 14. A similar bore 15 and outlet 16 are provided at the other end of the rod 8.

In the process of producing the pipe a concrete pipe made in the usual manner is taken and the expander 3 inserted therein. One end of the rod 8 is then connected to a source of pressure, such as water pressure, the other being employed to vent the air therefrom, and water introduced into the rear of the rubber lining 5 until the air is expelled, then the outlet is closed and a sufficient pressure or head of water placed within the pipe as to exceed preferably what the pipe is designed thereafter to retain. This results in the rubber lining 4 expanding and placing tension on the concrete of the pipe, such as to normally rupture the pipe, with the steel reinforcing stretching, however, to hold the pipe in ruptured or cracked position surrounding the expander 3. With the pressure still imposed thereon, we then proceed to seal all of the seams or cracks which have been placed in the concrete of the pipe. For this purpose, we preferably use sulphur or a sulphur composition of the type commonly used for setting steel or metal in concrete. The sulphur or sulphur composition is in the molten condition when it is placed into the seams produced, and in cooling and solidifying it has the property of expanding and thoroughly sealing any of the seams open in the pipe. Upon completion of the sealing operation and cooling and hardening of the sealing composition, the pressure is then released from the expander 3 and the expander 3 removed from the pipe. This leaves the concrete pipe with the steel in a prestretched condition, holding the concrete under a condition of compression. The resulting pipe may thereafter be used to hold heavy internal pressure.

Preferably, in the operation of producing pipe, we regulate the point at which the bursting or cracking of the concrete will take place so as to facilitate the operation of sealing the same. For this purpose, the pipe is preferably scored before rupture. This may be done, for example, in the original operations of forming the pipe by placing suitable elements in the molds used to produce the pipe. In Figure 4, we have shown a concrete pipe 1a with an elliptical reinforcement 2a, and in such a case have used the scores 18 and 19, as indicated at the point where the steel most closely approaches the interior wall of the pipe, for the purpose of causing the pipe to rupture at this point during the process. Scores 18 and 19 in the resulting seam ruptured in the pipe are filled in the operation with the sealing material or sulphur compound. In Figure 5, we have shown in modified form a concrete pipe 1b with a circular reinforcement 2b, this pipe being preferably prescored at points 20 in order to facilitate rupture of such a pipe at the indicated prescored points to facilitate location and sealing of the resulting ruptures.

While the particular form of concrete pipe and process of producing the same herein described is well adapted to carry out the objects of the present invention, it is to be understood that various modifications and changes may be made without departing from the principles of the invention, and the invention includes all such modifications and changes as come within the scope of the appended claims.

We claim:

1. A process of producing a concrete pipe which comprises first forming the concrete pipe with a steel reinforcing and with scores defining rupture points, then applying an internal pressure to the pipe sufficient to rupture the concrete of the pipe at such rupture points and place the steel under tension, while retaining the steel under tension filling the ruptured points with a filling, and thereafter removing the internal pressure so as to produce a finished pipe with the steel maintained under tension and the filling under compression.

2. A process of producing a reinforced concrete pipe with the reinforcement under tension and the concrete under compression, which comprises applying an internal pressure greater than that which the pipe is intended to sustain to a reinforced concrete pipe scored to define rupture points, rupturing the concrete and filling the ruptures with a filler, and then relieving the internal pressure.

3. A process of producing concrete pipe which comprises first forming a reinforced concrete pipe having predetermined points where the concrete is of reduced strength, then subjecting the same to an internal pressure sufficient to rupture the same at such points of reduced strength and place the steel under tension, while retaining the steel under tension sealing the resulting ruptures of the pipe, then removing the internal pressure in the pipe so as to leave a finished pipe with a steel reinforcement under tension and the filling material under compression.

4. A process of producing concrete pipe which comprises first forming a reinforced concrete pipe having predetermined points where the concrete is of reduced strength, then subjecting the same to an internal pressure sufficient to rupture the same at such points of reduced strength and place the steel under tension, while retaining the steel under tension sealing the resulting ruptures of the pipe with a filling including sulphur, then removing the internal pressure in the pipe so as to leave a finished pipe with a steel reinforcement under tension and the filling material under compression.

5. A concrete pipe having a metallic reinforcement, said reinforcement being in a prestretched condition, the concrete of the pipe having points of predetermined reduced strength and being ruptured at such points, sealing material filling the ruptures in such a manner as to maintain such prestretched condition of the reinforcing steel.

6. A concrete pipe having a metallic reinforcement, said reinforcement being in a pre-stretched condition, the concrete of the pipe having scores defining predetermined points where the concrete is of reduced strength, the concrete being ruptured at said points, a filling sealing said ruptures in such a manner as to retain said prestretched condition of said reinforcement.

JOSEPH G. PROSSER.
ELMER L. JOHNSON.